June 17, 1924.
L. E. SHAW
VEHICLE STEERING GEAR
Filed June 24, 1921
1,497,742
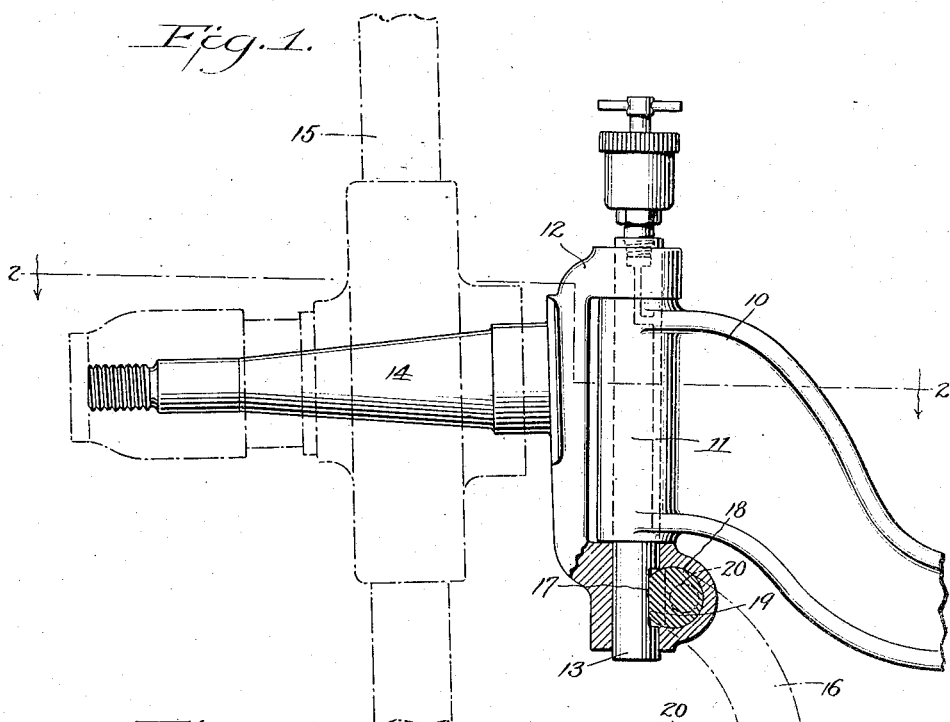
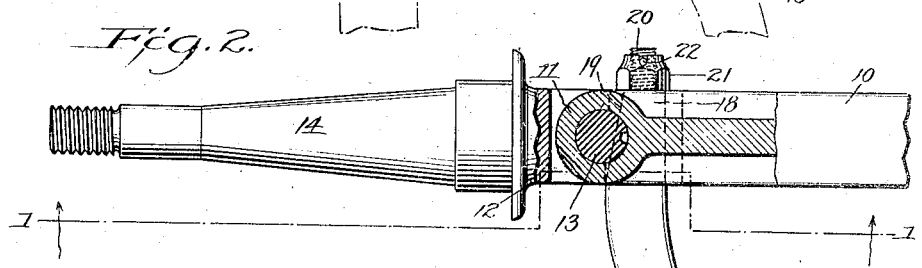
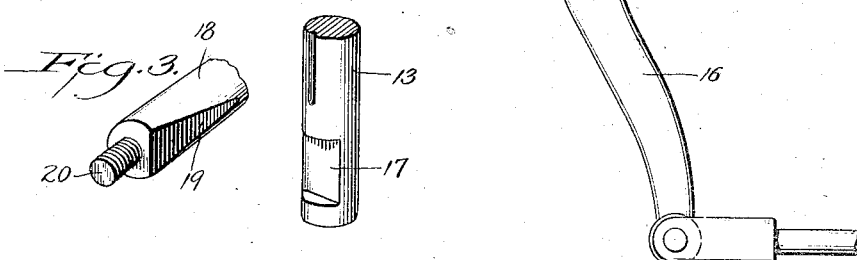
WITNESSES
INVENTOR
Louis E. Shaw
BY
ATTORNEYS Patented June 17, 1924.

1,497,742

UNITED STATES PATENT OFFICE.

LOUIS E. SHAW, OF EAST ORANGE, NEW JERSEY, ASSIGNOR TO WILLIAMS MOTORS INC., OF NEW YORK, N. Y., A CORPORATION OF DELAWARE.

VEHICLE STEERING GEAR.

Application filed June 24, 1921. Serial No. 480,134.

*To all whom it may concern:*

Be it known that I, LOUIS E. SHAW, a citizen of the United States, and residing at East Orange, county of Essex, State of New Jersey, have invented certain new and useful Improvements in Vehicle Steering Gears, of which the following is a complete specification, the particular novel features being more fully pointed out in the annexed claims.

My invention is illustrated in the accompanying drawings in which,

Fig. 1 is a side elevation of the steering gear, partly in section on the line 1—1 in Fig. 2, Fig. 2 is a plan view thereof, partly in section on the line 2—2, and Fig. 3 is a perspective view of the interlocking knuckle pin and steering arm ends.

My invention refers to steering gears, particularly adapted for motor vehicles and the like, and has for its purpose to simplify the connection and attachment of the knuckle pin and steering arm to the steering knuckle, so that by the attachment of only one of these elements, the other is automatically locked thereby to the steering knuckle.

Referring to the drawings 10 represents the front axle end of a motor vehicle which carries the conventional vertical bushing 11 to which the steering knuckle 12 is pivotally attached by means of pivot pin 13, rotatably disposed in bushing 11. 14 is the spindle, integral with knuckle 12, on which the vehicle wheel 15 (shown in dotted lines) is mounted. 16 is the steering arm fastened to the knuckle and by which the latter is operated in the customary manner.

The usual construction of the pivotal arrangement between knuckle 12 and bushing 11 is such that knuckle pin 13 is provided with a head at the top and with a threaded end at the bottom by which the pin is drawn tight in the knuckle, a key-way being usually provided with a key preventing the pin from rotation in the knuckle.

The steering arm is usually fastened in the knuckle by means of a tapered end, set in the knuckle and drawn tightly into it by a nut threaded onto a stud provided on the end of the arm. This construction therefore necessitates two separate means of fastening and the additional labor of cutting key-ways into the knuckle pin and into the tapered arm end to prevent these elements from rotating in their seats.

The present construction overcomes these disadvantages and simplifies the fastening of these elements such that they will interlock each other as soon as one of them has been fastened to the knuckle.

This object is accomplished in the following manner: Knuckle pin 13 is provided with a transverse flattened portion 17 at the point where this pin is closely adjacent to the steering arm end 18 which is seated in the knuckle. This arm end 18 is preferably cylindrical in its shape, but the cylindrical surface facing the knuckle pin is provided with a flat taper 19 which engages the transverse taper 17 of knuckle pin 13. Thus both of these elements interlock each other such that neither of them may turn in its seat and such that the knuckle pin is at the same time prevented from longitudinal movement. For the purpose of drawing steering arm end 18 tightly into its seat against pin 17, a stud 20 is arranged at the arm end 18 onto which the nut 21 is threaded which rests against the knuckle body. Nut 21 is locked in the conventional manner by means of split pin 22.

The two interlocking elements 17 and 18 may be seen clearly in perspective view in Fig. 3.

Thus by attaching one single nut 21 both elements 13 and 18 become attached to the knuckle and interlock with each other.

I claim:—

1. In a vehicle steering gear the combination of the vehicle axle end, a knuckle yoke carrying the wheel spindle, a pivotal element for pivotally attaching said knuckle to said axle end and a steering arm element supported in said knuckle adjacent to said pivotal element, one of said elements having a flat tapered surface, the other element having a flat surface parallel to its longitudinal axis, said two surfaces adapted to engage with each other to prevent rotary movement of either element, and means for pulling said tapered element into said knuckle to simultaneously lock the pivotal element and said arm element in place.

2. In a vehicle steering gear the combination of the vehicle axle end, a knuckle yoke carrying the wheel spindle, a pivot pin for pivotally attaching said knuckle to said axle end and a steering arm fixed to said knuckle, said arm having on the portion, connected with said knuckle, a flat tapered surface, said pivot pin having a flat surface, adjacent to said tapered arm portion, which is adapted to engage therewith to prevent longitudinal and rotary movement of the pin and rotary movement of said arm portion in said knuckle, and means for pulling said tapered arm portion tightly against said pin to simultaneously lock the pivot pin and the steering arm in place.

3. In a vehicle steering gear the combination of the vehicle axle end, a knuckle yoke carrying the wheel spindle, a pivot pin for pivotally attaching said knuckle to said axle end and a steering arm fixed to said knuckle, said arm having the portion connected with said knuckle cylindrically shaped and provided with a flat tapered surface, said pivot pin having a flat surface, adjacent to said tapered arm portion, which is adapted to engage therewith to prevent longitudinal and rotary movement of the pin and rotary movement of said arm portion in said knuckle and means for pulling said tapered arm portion tightly against said pin to simultaneously lock the pivot pin and the steering arm in place.

4. In a vehicle steering gear the combination of the vehicle axle end, a knuckle yoke carrying the wheel spindle, a pivotal element for pivotally attaching said knuckle to said axle end and a steering arm element supported in said knuckle adjacent to said pivotal element, means for locking one of said elements to said knuckle and means for causing said element when so locked to lock the other element to said knuckle.

LOUIS E. SHAW.